(No Model.)
H. F. BEIMLING.
CENTRIFUGAL CREAMER.
No. 382,506. Patented May 8, 1888.
Fig. 1.
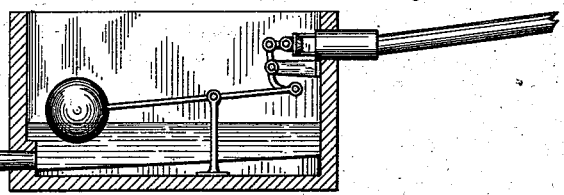
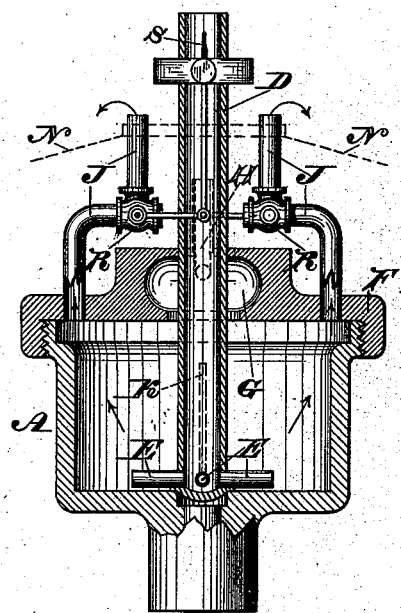
Fig. 2.
Fig. 4.
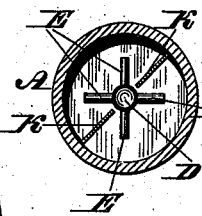
Fig. 3.
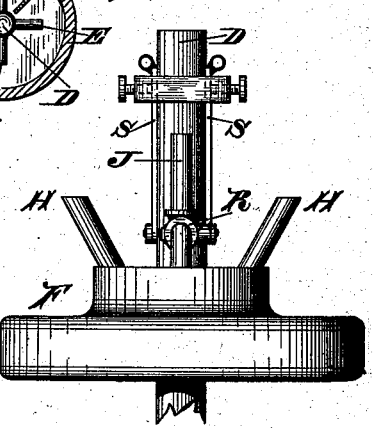
WITNESSES:
A. P. Jennings
L. Douville
INVENTOR:
Henry F. Beimling
BY John A. Wiedersheim
ATTORNEY.

UNITED STATES PATENT OFFICE.

HENRY F. BEIMLING, OF PHILADELPHIA, PENNSYLVANIA, ASSIGNOR TO CHARLES H. SCHWERDFEGER AND CHARLES S. WEIERMAN, OF SAME PLACE.

CENTRIFUGAL CREAMER.

SPECIFICATION forming part of Letters Patent No. 382,506, dated May 8, 1888.

Application filed July 19, 1887. Serial No. 244,700. (No model.)

*To all whom it may concern:*

Be it known that I, HENRY F. BEIMLING, a subject of the Emperor of Germany, having resided one year last past in the United States and made oath of intention to become a citizen thereof, a resident of the city and county of Philadelphia, State of Pennsylvania, have invented a new and useful Improvement in Centrifugal Creamers, which improvement is fully set forth in the following specification and accompanying drawings.

My invention consists of an improvement in centrifugal apparatus more especially designed for the separation of cream from milk, as will be hereinafter fully set forth, and definitely claimed.

Figure 1 represents a partial side elevation and partial vertical section of a cream and milk separator embodying my invention. Fig. 2 represents a vertical section of a portion at a right angle to Fig. 1. Fig. 3 represents a side elevation of a detached portion. Fig. 4 represents a horizontal section in line $x$ $x$, Fig. 1, on a reduced scale.

Similar letters of reference indicate corresponding parts in the several figures.

Referring to the drawings, A represents a cylindrical or other shaped vessel, which is connected with a vertical shaft, B, whose bearings are on the frame C, and which receives motion in any suitable manner.

D represents a tube for supplying the vessel A with milk, the same being secured within said vessel and having at bottom the distributing-pipes E, which open into the vessel.

F represents a cap, which tightly closes the vessel A and has at the center a chamber, G, which surrounds the tube D and is in communication with the vessel A. Connected with said cap F, near the center thereof and inclining outwardly, are pipes H, which communicate with the chamber G, and also connected to said cap, near the periphery thereof, are pipes J, leading from the vessel A. Within the vessel A, above the bottom thereof, are blades K, which are secured to the vessel A so as to rotate therewith, for purposes to be hereinafter explained.

Encircling the vessel A and rising above the same is a jacket, L, secured within which are tables M N, which are of convex form having vertical flanges on their upper rims, and located at different altitudes, so as to surround the discharge ends of the pipes H J, respectively.

To the jacket L, at the outer rims of the tables, are secured pipes P Q, respectively, which are in communication with the chambers M' N', formed, respectively, by the tables M N and jacket L. The pipes J are provided with cocks R, which have attached to them arms S, whereby they may be conveniently operated at the top of the jacket L, and the discharge of milk through said pipes adjusted.

The operation is as follows: Power is applied to the shaft B, whereby the vessel A is rotated. Milk is directed into the tube D and distributed by the pipes E into the vessel A, and subjected to centrifugal action therein, whereby the milk and cream separate. The milk, being heavier, is directed to the periphery of the vessel, while the cream, being lighter, gathers around the tube D. The cream as it increases in quantity rises and enters the chamber G and pipes H and discharges therefrom at the top of the latter on the table M, and reaches the pipe or spout P, from whence it may be directed into a suitable vessel. The skimmed milk ascends at the periphery of the vessel, enters the pipes J, and discharges therefrom on the table N, and so reaches the pipe Q, from whence it may be collected. Owing to the blades K the milk is carried around with the vessel, whereby the proper separation of the cream from the milk is assured.

Having thus described my invention, what I claim as new, and desire to secure by Letters Patent, is—

1. In a centrifugal separator, the rotary vessel A, in combination with the supply-tube D, the cap F, having the chamber G therein, communicating with said vessel A, the pipes H, inclining outward from said chamber G, the pipes J, leading from the periphery of said vessel A through said cap F, the jacket L, encircling said vessel A, the tables M and N, and the discharge-pipes P and Q, substantially as described.

2. In a centrifugal separator, the rotary vessel A, in combination with the stationary supply-tube D, the cap F, having the chamber G, the outward-inclined pipes H, the pipes J, the jacket L, and the flanged tables M and N, the said pipes H and J respectively extending above the flanged rim of said tables M and N, substantially as and for the purpose set forth.

3. In a centrifugal separator, the vessel A, with inlet-tube D, having distributing-pipes E, in combination with cap F, having chamber G, the pipes H and J, leading, respectively, from chamber G and vessel A, the cock R in said pipe J, and arms S, attached to said cock, substantially as and for the purpose set forth.

HENRY F. BEIMLING.

Witnesses:
JOHN A. WIEDERSHEIM,
A. P. JENNINGS.